United States Patent
Akita et al.

Patent Number: 5,741,197
Date of Patent: Apr. 21, 1998

[54] POWER TRANSMISSION BELT AND METHOD OF MANUFACTURING THE SAME

[75] Inventors: Kazuhiro Akita; Hiroo Osada, both of Hyogo, Japan

[73] Assignee: Mitsuboshi Belting Ltd., Hyogo, Japan

[21] Appl. No.: 602,105

[22] Filed: Feb. 22, 1996

Related U.S. Application Data

[62] Division of Ser. No. 349,821, Dec. 6, 1994, Pat. No. 5,536,214.

[30] Foreign Application Priority Data

Dec. 7, 1993 [JP] Japan ..................... 5-340651
Dec. 7, 1993 [JP] Japan ..................... 5-340652

[51] Int. Cl.⁶ .................................................. F16G 1/04
[52] U.S. Cl. ............................................... 474/268
[58] Field of Search ................................ 474/263, 266, 474/267, 268

[56] References Cited

U.S. PATENT DOCUMENTS

| | | | |
|---|---|---|---|
| 4,583,963 | 4/1986 | Marsh et al. | 474/268 X |
| 4,632,665 | 12/1986 | Skura | 474/268 X |
| 4,838,843 | 6/1989 | Westhoff | 474/205 |
| 4,895,555 | 1/1990 | Watanabe et al. | 474/263 X |
| 5,536,214 | 7/1996 | Akita et al. | 474/268 |

FOREIGN PATENT DOCUMENTS

| | | |
|---|---|---|
| 46-6412 | 6/1971 | Japan . |
| 63-66648 | 6/1988 | Japan . |
| 5-62657 | 8/1993 | Japan . |

*Primary Examiner*—Roger J. Schoeppel
*Attorney, Agent, or Firm*—Wood, Phillips, VanSanten, Clark & Mortimer

[57] ABSTRACT

An improvement in a power transmission belt of the type having a body with a length, laterally spaced sides, an inside, an outside, teeth spaced in a lengthwise direction on the inside of the body, grooves between adjacent teeth, and a longitudinally extending load carrying cord. The power transmission belt further has a power transmission area on the body defined between the load carrying cord and a line spaced inside of the load carrying cord a distance approximately ⅔ H, where H is the distance between the load carrying cord and the inside of the body. The invention is also directed to a method of forming the above belt.

16 Claims, 4 Drawing Sheets
(1 of 4 Drawing(s) in Color)

POWER TRANSMISSION BELT AND METHOD OF MANUFACTURING THE SAME

This is a division of application Ser. No. 08/349,821 filed Dec. 6, 1994, now U.S. Pat. No. 5,536,214.

BACKGROUND OF THE INVENTION

1. Field of the Invention

This invention relates to power transmission belts and, more particularly, to a toothed power transmission belt having a reinforcing fabric layer in the teeth. The invention is further directed to a method of forming the above toothed power transmission belt.

2. Background Art

It is known to make toothed power transmission belts from rubber, liquified polyurethane, etc. Toothed power transmission belts made of polyurethane have excellent resistance to degradation from conditions encountered in an exterior environment. They also have good resistance to wear. As a result, this type of belt has been used as a power transmission device on a bicycle for outdoor use. This type of belt has alternating teeth and grooves along the length thereof, each with a fixed pitch. Load carrying cords made of glass, aramid fibers, or the like, are buried in a backing layer at the pitch line.

This type of belt has no structure that reinforces the teeth at the base thereof near the grooves. Abrasion at the base of the teeth may ultimately lead to damage to the load carrying cord. More specifically, foreign matter such as dust, sand, and the like, may become trapped between the projections on a cooperating pulley and the belt in the groove area with the belt system in operation. This trapped matter tends to abrade the base of the teeth in the groove area and may ultimately cause exposure of the load carrying cord. Once this occurs, the cord is contacted by moisture in normal use. This moisture may diminish the strength of the load carrying cord and ultimately cause premature belt failure.

To avoid this abrasion problem, it is known to place roughly woven fabric at the base of the teeth in a polyurethane synchronous belt. This is taught, for example, in Examined Japanese Utility Model Publication No. 6412/1971.

Unexamined Japanese Utility Model Publication No. 66648/1988 teaches a polyurethane toothed belt with a non-woven fabric, impregnated with elastomeric material, applied along the base of the teeth.

In Japanese Patent Publication No. 9335/1991, a high load, polyurethane, toothed belt is disclosed with the teeth and the base thereof covered with a canvas layer. A load carrying cord therein is made of aramid cord type II having a tensile elasticity rate of approximately $1.3 \times 10^6$ kg/cm² in greige filament.

Examined Japanese Patent Publication No. 62657/1993 discloses another polyurethane toothed belt wherein a slightly compressed, non-woven fabric impregnated with elastomeric material is applied at the base of the teeth in the grooves between adjacent teeth. The non-woven fabric extends into and is dispersed within the teeth to effect reinforcement thereof. The entire tooth is reinforced, even at the inside thereof where compressive forces are the lowest.

The prior art polyurethane toothed belts having a canvas cover layer on both the belt teeth and the base of the teeth in the grooves permit high load transmission since the canvas protects the teeth and the base thereof such that little damage occurs to the load carrying cord after use. However, in manufacturing this belt, the canvas cannot be properly adhered to the tooth surfaces without preapplying the canvas conformingly in the grooves in a metallic mold.

Unexamined Japanese Patent Publication No. 246532/1988 discloses a method for applying a bulky, non-woven fabric over the grooves of an internal mold by wrapping a load carrying cord therearound prior to injection of a liquified polyurethane into the mold.

SUMMARY OF THE INVENTION

In one form of the invention, an improvement is provided in a power transmission belt of the type having a body with a length, laterally spaced sides, an inside, an outside, teeth spaced in a lengthwise direction on the inside of the body, grooves between adjacent teeth, and a longitudinally extending load carrying cord. The power transmission belt further has a power transmission area on the body defined between the load carrying cord and a line spaced inside of the load carrying cord a distance approximately ⅔ H, where H is the distance between the load carrying cord and the inside of the body.

The improvement is a non-woven fabric on the inside of the belt body in a plurality of the grooves and extending continuously from each of the plurality of grooves into a tooth in the power transmission area.

The power transmission area may be defined more restrictively between the load carrying cord and the line spaced inside of the load carrying cord a distance approximately ½ H.

It is one objective of the present invention to provide reinforcement of the belt teeth in the area where they are most highly stressed in compression with the belt engaged with and driving/driven by a cooperating pulley. The high strength belt can be constructed without the necessity of reinforcing the entire tooth.

In one form, there is one tooth having first and second grooves adjacent thereto and the fabric extends continuously from the first groove through the one tooth and into the second groove.

The fabric preferably extends continuously along the entire length of the body.

In one form, the teeth each have lengthwise ends and the fabric is spaced non-uniformly from the load carrying cord between the lengthwise ends of the teeth.

The fabric may be impregnated with an elastomeric material.

In one form, the fabric is defined by a plurality of fibers that are needle-punched.

The fabric may have a non-uniform thickness along the length of the body.

The fabric may have a thickness of 1.0 to 2.0 mm and a weight of 130 to 250 g/m².

The power transmission belt may include staple reinforcing fibers separated from the fabric and located in the power transmission area.

A part of the body is preferably defined by an elastomeric material. The staple fibers may be dispersed in the elastomeric material such that the density of the staple fibers in the elastomeric material is either uniform or non-uniform in the power transmission area.

In one form, there is a higher density of staple fibers on the outside of the power transmission area than on the inside of the power transmission area.

The fabric may be made by needle punching first fibers having a length of 5 to 60 mm, with the first fibers being at least one of polyethylene, polypropylene, polyamid, polyester, acryl, and glass.

In another form of the invention, an improvement is provided in a power transmission belt of the type having a body with a length, laterally spaced sides, an inside, an outside, teeth spaced in a lengthwise direction on the inside of the body, grooves between adjacent teeth, and a longitudinally extending load carrying cord. The power transmission area on the body is defined between the load carrying cord and a line spaced inside of the load carrying cord a distance approximately ⅔ H, where H is the distance between the load carrying cord and the inside of the belt body.

The improvement is a fabric in the power transmission area in the teeth spaced non-uniformly from the load carrying cord along the length of the belt body.

It is another object of the invention to provide a simplified manufacturing process to reinforce the toothed belt in the regions where it is most highly stressed in compression during operation.

Accordingly, the invention is further directed to a method of forming a power transmission belt/belt sleeve, which method includes the steps of: providing an internal mold having a mold surface with alternating projections and recesses that are complementary to alternating teeth and grooves on a power transmission belt/belt sleeve; providing a non-woven fabric with staple fibers therein; placing the non-woven fabric over the mold surface; providing a load carrying cord; winding the load carrying cord over the non-woven fabric; placing the internal mold with the non-woven fabric and load carrying cord thereon into an external mold to define a mold spaced between the internal and external molds; providing a supply of liquified matrix material; directing the liquified matrix material into the mold space so that the discrete fibers separate from the non-woven fabric; and curing the liquified matrix material.

The method may include the step of causing the non-woven fabric to move partially into the recesses on the internal mold.

The step of providing a non-woven fabric may include the step of needle punching the fabric.

The non-woven fabric has oppositely facing surfaces and a core between the oppositely facing surfaces. The step of needle punching may include the step of needle punching the fibers so that the fibers are denser at at least one of the oppositely facing surfaces than the fibers are in the core. This needle punching may take place so that the fibers have a weight of 50–100 g/m² at at least one of the oppositely facing surfaces and a weight of 20–50 g/m² in the core.

The method may involve the step of separating fibers from the non-woven fabric so that the separated fibers are embedded in the liquified matrix material.

The step of separating fibers may involve the step of separating fibers from the non-woven fabric so that the separated fibers are embedded in the transmission area that is inside of the load carrying cord up to a distance of approximately ⅔ H, where H is the distance between the load carrying cord and the inside of the belt/belt sleeve.

The step of separating the fibers may involve separating fibers from the non-woven fabric so that the separated fibers are embedded in the transmission area that is inside of the load carrying cord up to a distance of approximately ½ H, where H is the distance between the load carrying cord and the inside of the belt/belt sleeve.

The step of providing a non-woven fabric may involve using staple fibers that are 5 to 60 mm long and that are at least one of polyethylene, polypropylene, polyamid, polyester, acryl and glass.

The step of providing the fabric may involve the step of providing a non-woven fabric having a thickness of 1.0 to 2.0 mm before the load carrying cord is wound over the non-woven fabric.

The step of providing a supply of liquified matrix material may involve the step of providing a supply of liquified polyurethane.

Liquified matrix material may be injected into the external mold before the internal mold is placed into the external mold.

In one form, the non-woven fabric has oppositely facing surfaces and a core between the oppositely facing surfaces. The method may include the step of treating the fibers in the core with a binder.

The method may further include the steps of separating the belt/belt sleeve from the internal and external molds and cutting the belt/belt sleeve to define a plurality of endless, toothed belts.

The invention further contemplates a method of forming a power transmission belt/belt sleeve by providing a mold defining a mold space, placing a non-woven fabric with individual fibers therein in the mold space, injecting a liquified matrix material into the mold space and thereby causing fibers to separate from the non-woven fabric in the mold space, curing the liquified matrix material, and separating the power transmission belt/belt sleeve from the mold.

BRIEF DESCRIPTION OF THE DRAWINGS

The file of this patent contains at least one photograph executed in color. Copies of this patent with color photographs will be provided by the Patent and Trademark Office upon request and payment of the necessary fee.

DETAILED DESCRIPTION OF THE DRAWINGS

Figure 1:
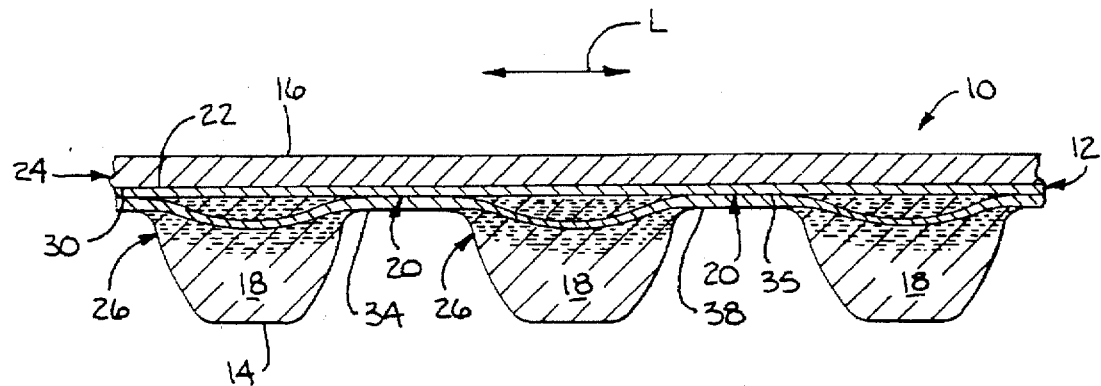
FIG. 1 is a cross-sectional view of a portion of a power transmission belt, according to the present invention.
Figure 2:
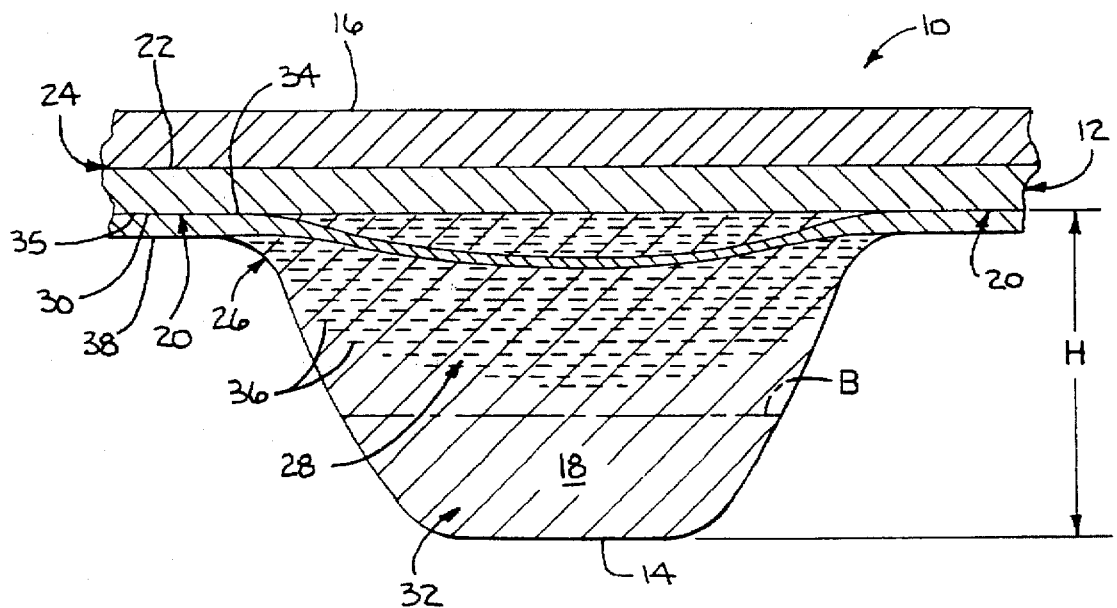
FIG. 2 is an enlarged, cross-sectional view of one of the teeth on the belt in FIG. 1.

In FIGS. 1 and 2, a toothed power transmission belt, according to the present invention, is shown at 10. The power transmission belt 10 has a body 12 with a length, in the direction of the double-headed arrow L, laterally spaced sides, an inside 14, and an outside 16. Teeth 18 are spaced regularly along the length of the belt, with there being grooves 20 between adjacent teeth 18. A load carrying cord 22 is embedded in a backing layer 24.

A preferred matrix material for the belt body 12 is liquified polyurethane, however, other materials, known to those skilled in the art, could be used as well.

The highest compressive forces on the belt 10 during operation are concentrated in the base/root area 26. According to the invention, localized reinforcement of the teeth 18 is provided in the high stress area, which localized area, for purposes of this invention, is identified as the power transmission area 28. The power transmission area 28 is defined herein as the area outside of the line B. Line B is located inside of the edge 30 of the load carrying cord 22 a distance ⅔ H, where H, as shown in FIG. 2, is the distance from the cord edge 30 to the inside 14 of the tooth 18. More preferably, the power transmission area 28, which is reinforced according to the present invention, is that area located inside of the load carrying cord 22 up to a distance ½ H.

The area of the tooth 18 at 32, inside of the line B, is not as highly stressed as the area 28 and need not be reinforced, according to the present invention. That is, the elastomeric matrix material alone provides the necessary strength.

According to the invention, a non-woven fabric 34, impregnated with an elastomeric material, extends continuously along the length of the belt 10, covering the inside groove surface 35 and extending continuously through the teeth 18. The fabric 34 is thinner in the power transmission area 28 than it is in the groove area. The fabric 34 curves down in the power transmission area 28 to provide reinforcement over a substantial thickness of the tooth 18.

To provide further reinforcement in the power transmission area 28, staple, reinforcing fibers 36 are dispersed therein. In a preferred form, the fibers 36 are separated from the fabric 34 during the manufacturing process, described in detail below, to be controllably and strategically dispersed in the power transmission area 28. With the inventive method of formation, the fibers 36 are more concentrated in the base/root area 26 of the teeth 18. This is desirable in that the base/root area 26 is the most highly stressed and in need of reinforcement in use. However, the invention contemplates that the fibers 36 can be uniformly distributed throughout the power transmission area, or a part thereof.

Because of the localized reinforcement with the fibers 36, less reinforcing material is required compared to the prior all belts which have a uniform dispersion of fibers throughout the teeth.

Figure 3:
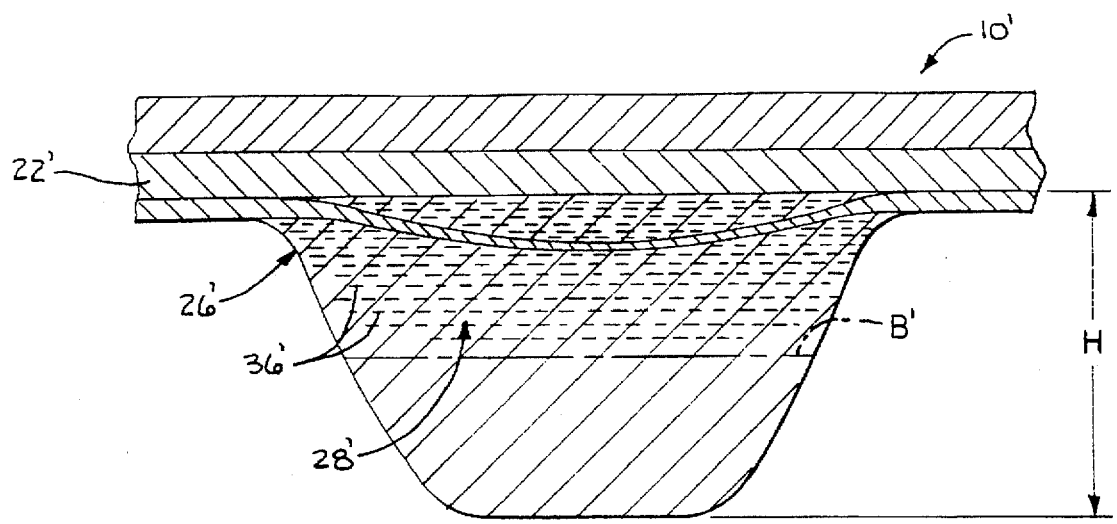
FIG. 3 is a view as in FIG. 2 of a modified form of belt, according to the present invention.

In FIG. 3, a modified form of belt is shown at 10' wherein the fibers 36' are more highly concentrated near the base/root area 26'. This tends to prevent crack generation thereat. In this embodiment, the power transmission area 28' is bounded by a line B' that is spaced inside of the load carrying cord 22' a distance ½ H.

The fabric 34 is preferably made from textile fibers having a length of 5 to 60 mm long. The fibers may be at least one of polyethylene, polypropylene, polyamid, polyester, acryl, glass, or the like.

In a preferred form, the fabric 34 is formed by a conventional needle punching operation. This operation causes the fibers 36 to twist and entangle with each other to provide good mechanical strength, even without using a binder. At the same time, the fibers 36 are caused to separate from the fabric 34 so as to provide reinforcement away from the fabric 34.

In a preferred form, the non-woven fabric 34, prior to forming, is 1.0–2.0 mm thick, based on JIS L1085, with its weight being between 130 and 250 g/m². If the thickness of the non-woven fabric 34 exceeds 2.0 mm, the PLD value from the fabric surface 38 (FIGS. 1 and 2) within the grooves 20 to the center of the load carrying cord 22 becomes too high. With the belt made according to the preferred manufacturing method, as described below, and utilizing an internal mold having a fabric layer 34 thereon wrapped by the load carrying cord 22 prior to insertion of the internal mold into an external mold and injection of liquified polyurethane, the fibers 36 disperse from the fabric 34 into the power transmission area 28 to near the inside 14 of the belt. Using this method and a fabric 34 in excess of 2.0 mm in thickness results in a lower than desired density of fibers 36 in the power transmission area 28, which thereby reduces the effectiveness of the reinforcement in the high compression areas.

If the thickness of the fabric 34 is less than 1.0 mm, the PLD value becomes too small to protect the load carrying cords 22. Additionally, the quantity of the fibers 36 dispersed is insufficient to adequately reinforce the power transmission area 28.

The fibers 36 separated from the fabric 34 and dispersed in the power transmission area 28 are preferably 30 to 60 cubic percent of the original fabric 34.

In a preferred form, the load carrying cord 22 is made from either a para-family aramid fiber, such as those sold commercially under the trademarks "TWARON"™, "KEVLAR"™, and "TECHNORA"™, or glass fiber, such as E glass or other highly resistant glass. The composition, denier and twist for the fibers are not critical to the present invention.

Figure 4:
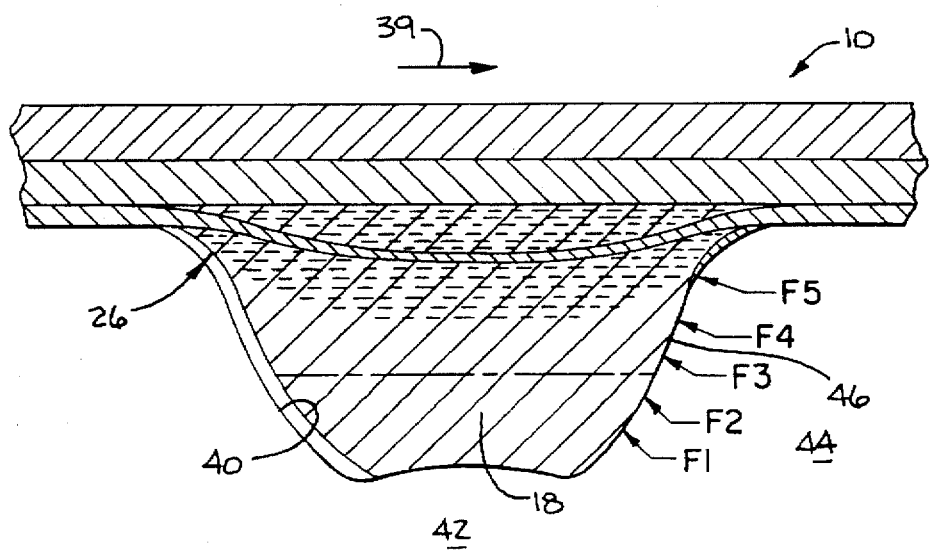
FIG. 4 is a cross-sectional view of a belt tooth, according to the present invention, and operatively engaged with a cooperating pulley.

The invention tends to diminish crack formation at the base/root area 26 by reason of the localized placement of the fabric 34 and fibers 36 in the power transmission area 28 subjected to high compressive forces, as described above. The relative magnitude of forces applied to the teeth 18 in operation is shown in FIG. 4, with a belt 10 being advanced in the direction of the arrow 39 within a groove 40 on a pulley 42. As the belt 10 advances, the magnitude of the forces applied by a pulley tooth 44 on the leading face 46 of the teeth 18 increased progressively from the inside 14 of the belt up to the base/root area 26, as shown by the force lines F1 through F5. A large compressive force is exerted by the pulley tooth 44 in the base area 26.

Figure 5:
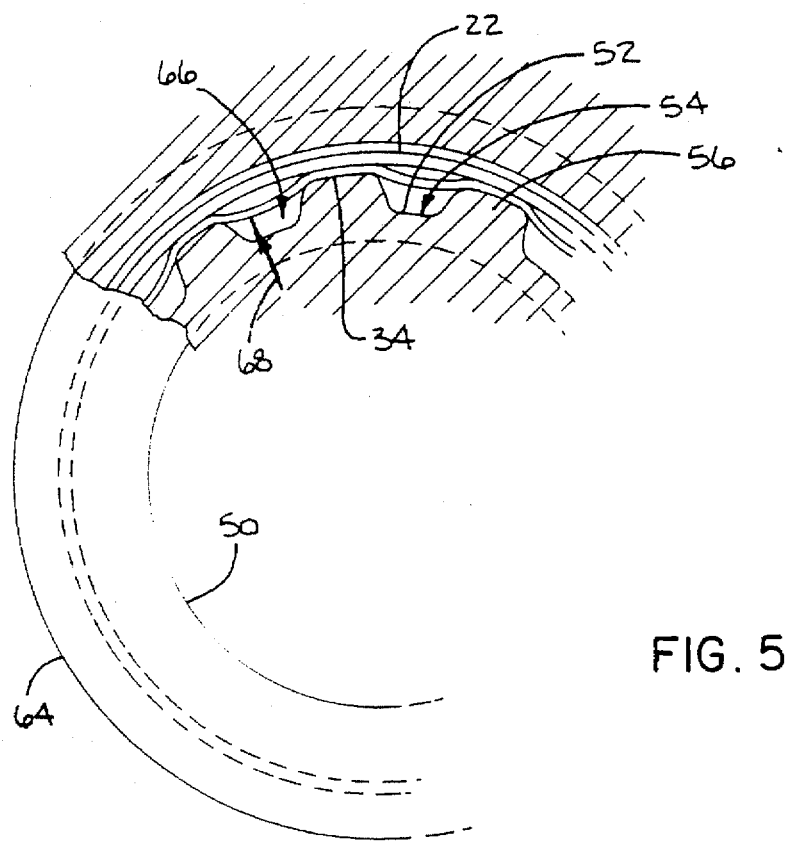
FIG. 5 is a partial cross-sectional view of a mold system used to make the inventive belt.

Manufacture of the inventive belt is facilitated according to the present invention. A preferred method of making the inventive belt is described below with reference to FIGS. 5 and 6.

According to the invention, an internal mold 50 is utilized. The fabric 34 is wrapped over the exposed mold surface 52. The load carrying cord 22 is then wound compressibly around the fabric 34 on the mold surface 52 such that the fabric 34 deforms slightly into the recesses 54 defined between adjacent projections 56 on the internal mold 50.

Figure 6:
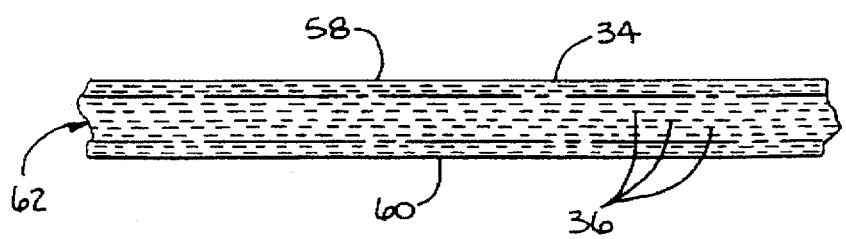
FIG. 6 is a cross-sectional view of one form of non-woven fabric used in the inventive belt.
Figure 7:
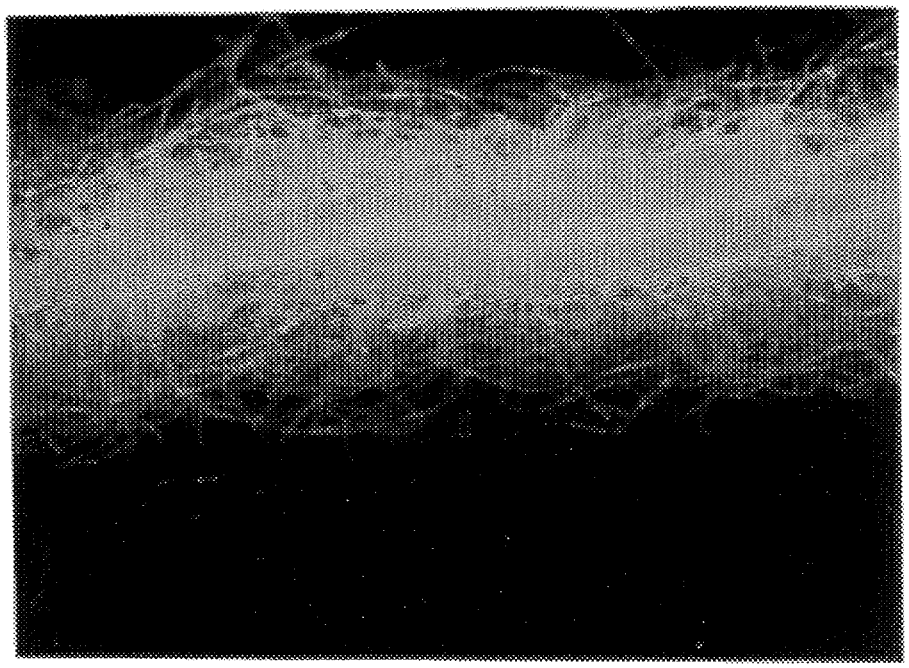
FIG. 7 is a photograph of a sample of non-woven fabric used in the inventive belt.

The fabric 34, as shown in FIG. 6, preferably has a non-uniform density of fibers 36. More particularly, the fabric 34 has oppositely facing surfaces 58, 60 which have a higher density of fibers 34 than the core 62 at the center between the surfaces 58, 60. The fibers on the surfaces 58, 60 are more easily separated during the manufacturing process, described below. Preferably, the core 62 of the fabric 34 has a weight of 20–50 g/m², with the weight of the surfaces 58, 60 being 50–100 g/m².

There is no specific restriction as to the ratio between the thickness of the core area 62 and the surfaces 58, 60. The thickness and weight of the surfaces 58, 60 can be changed to select the quantity of fibers 34 that separate and disperse as well as the degree of dispersion.

The core area 62 can be treated with a binder since the fibers 34 therein need not separate and disperse. However, this treatment is not preferred because it hardens the fabric 34.

The internal mold 50, with the fabric 34 and cord 22 wrapped thereon, is inserted within an external mold 64 so as to define a closed mold space 66 between the internal mold 50 and the external mold 64. After closing the mold, pressure is reduced in the mold space 66 to eliminate cells in the liquified polyurethane within the mold space 66 and to cause the liquified polyurethane to flow radially outwardly in the mold space 66. This causes the liquified polyurethane to move in the direction of the arrow 68 through the fabric 34 in the mold space 66. The turbulence of the liquified polyurethane separates the fibers 34 on the fabric surface 58 from the core 62 to be dispersed away from the fabric in the mold space 66.

The invention also contemplates that a predetermined amount of liquified polyurethane could be injected into the external mold 64 before the internal mold 50 is inserted therein. The same effect could be realized only after the internal mold 50 and external mold 64 are joined.

After the liquified polyurethane sets, the internal mold 50 and external mold 64 are separated, each from the other, to allow the pressure in the mold to increase to ambient pressure. The polyurethane is then cured at a fixed, predetermined temperature. The temperature of the mold 50 is 80°–150° C. After curing, the belt 10 is removed from the internal mold 50.

Most preferably, a belt sleeve is formed using the method described above. After the belt sleeve is cured, it is removed from the internal mold 50 whereupon it is cut into a plurality of belts of desired width.

With the inventive method, the fibers 36 separate in such a fashion as to be in a concentration to provide more reinforcement in the root/base area 26 through a relatively simple procedure.

The effectiveness of the present invention is demonstrated below by comparing the operating characteristics of the inventive belt with two comparative belts.

The Inventive Belt

A cylindrical non-woven fabric 34 made of 6—6 nylon fiber was wrapped on an internal mold 50. The fabric 34 was not treated with a binder and was formed by needle punching. The fabric 34 had a weight of 170 g/m² and was 1.3 mm thick.

The load carrying cord 22 was wrapped around the fabric 34 on the internal mold 50. The load carrying cord 22 was made using a pair of aramid fibers, sold commercially under the trademark "TWARON". Each fiber had 5 filaments of 1,090 denier (total denier of 1,090×5=5,450). One of the fibers was twisted 11 times per 10 cm in the S direction with the other twisted 25 times per 10 cm in the Z direction. A pair of fibers so defined, was used to make a load carrying cord which was spun without adhesive treatment. The load carrying cord 22 had an exclusive rate of 90.0 to 94.2%.

The internal mold 50 with the fabric 34 and load carrying cord 22 thereon was inserted into an external mold 64 which was preliminarily injected with a fixed amount of liquified polyurethane raw material (100 phr of prepolymer, 20 phr of hardening agent such as 3,3'-dicyclo 4, 4 aminodiphenylmethane, 20 phr of plasticizer, and 0.5 phr of coloring agent). The mold was tightly closed and the pressure in the mold space reduced to cause the liquified polyurethane to permeate the fabric 34. After the polyurethane set, the mold was opened and the belt sleeve exposed to atmospheric pressure and cured with the mold 50 at a temperature of 110° C. (the curing rate of polyurethane is 92 JIS-A). After curing, the belt sleeve was removed from the internal mold 50 and severed at predetermined axial locations to define individual belts 10. The resulting belt 10 had a profile S8M (STPD), with 156 teeth, a width of 12 mm, and a tooth pitch of 8 mm.

The resulting belt 10 is best seen in FIG. 2, wherein the fabric 34 is continuously applied in the groove area and extends continuously into the teeth 18 in the power transmission area 28, with the fibers 34 dispersed exclusively within the power transmission area 28.

The above belt 10 was placed on a biaxial, dynamic testing unit to determine durability. The belt 10 was trained around drive and driven pulleys, each having 36 teeth, and run at 1200 rpm under 4.8 KW load with an initial tensile force on the belt of 48 kg. The test results are shown in Table 1, below.

TABLE 1

|  | Example 1 | Comparative Example 1 | Comparative Example 2 |
| --- | --- | --- | --- |
| Life of belt running (hrs.) | 788 | 17 | 162 |
| Failure condition | Tooth broken | Cut off | Tooth broken |

Comparative Example 1

This was a toothed belt made similarly to the belt of Example 1, however without using a non-woven fabric.

Comparative Example 2

This belt was made similarly to the belt of Example 1, but was made using a woven fabric made of 0.4 mm thick nylon 6.

The results in Table 1 show that the inventive belt 10 had superior durability to both Comparative Examples 1 and 2. The former cut off in 17 hours, with the teeth in the latter breaking off in 162 hours. The teeth on the inventive belt lasted 788 hours.

The foregoing disclosure of specific embodiments is intended to be illustrative of the broad concepts comprehended by the invention.

We claim:

1. A method of forming a power transmission belt/belt sleeve, said method comprising the steps of:

providing an internal mold having a mold surface with alternating projections and recesses that are complementary to alternating teeth and grooves on a power transmission belt/belt sleeve to be formed;

providing a non-woven fabric with discrete fibers therein;

placing the non-woven fabric over the mold surface;

providing a load carrying cord;

winding the load carrying cord over the non-woven fabric;

placing the internal mold with the non-woven fabric and load carrying cord thereon into an external mold to define a mold space between the internal and external molds;

providing a supply of liquified matrix material;

directing the liquified matrix material into the mold space so that discrete fibers separate from the non-woven fabric; and curing the liquified matrix material.

2. The method of forming a power transmission belt/belt sleeve according to claim 1 including the step of causing the non-woven fabric to move partially into the recesses on the internal mold.

3. The method of forming a power transmission belt/belt sleeve according to claim 1 wherein the step of providing a non-woven fabric comprises the steps of providing a plurality of fibers and needle punching the fibers.

4. The method of forming a power transmission belt/belt sleeve according to claim 3 wherein the non-woven fabric has oppositely facing surfaces and a core between the oppositely facing surfaces and the step of needle punching the fibers comprises the step of needle punching the fibers so that the fibers are denser at at least one of the oppositely facing surfaces than the fibers are in the core.

5. The method of forming a power transmission belt/belt sleeve according to claim 3 wherein the non-woven fabric has oppositely facing surfaces and a core between the oppositely facing surfaces and the step of needle punching the fibers comprises the step of needle punching the fibers so that the fibers have a weight of 50–100 g/m² at at least one of the oppositely facing surfaces and a weight of 20–50 g/m² in the core.

6. The method of forming a power transmission belt/belt sleeve according to claim 1 including the step of separating fibers from the non-woven fabric so that the separated fibers are embedded in the liquified matrix material.

7. The method of forming a power transmission belt/belt sleeve according to claim 6 including the step of separating the power transmission belt/belt sleeve from the internal and external molds so that the power transmission belt/belt sleeve has an inside and an outside, and the step of separating fibers comprises the step of separating fibers from the non-woven fabric so that the separated fibers are embedded in a transmission area that extends inwardly from the load carrying cord a distance that is approximately ⅔ H, where H is the distance between the load carrying cord and the inside of the belt/belt sleeve.

8. The method of forming a power transmission belt/belt sleeve according to claim 7 wherein the step of separating fibers comprises the step of separating fibers from the non-woven fabric so that the separated fibers are embedded in a transmission area that extends inwardly from the load carrying cord a distance that is approximately ½ H, where H is the distance between the load carrying cord and the inside of the belt/belt sleeve.

9. The method of forming a power transmission belt/belt sleeve according to claim 1 wherein the step of providing a non-woven fabric comprises the step of providing a non-woven fabric with staple fibers thereon that are 5–60 mm long.

10. The method of forming a power transmission belt/belt sleeve according to claim 1 wherein the step of providing a non-woven fabric comprises the step of providing a non-woven fabric with staple fibers thereon that are at least one of polyethylene, polypropylene, polyamid, polyester, acryl and glass.

11. The method of forming a power transmission belt/belt sleeve according to claim 1 wherein the step of providing a non-woven fabric comprises the step of providing a non-woven fabric having a thickness of 1.0–2.0 mm before the load carrying cord is wound over the non-woven fabric.

12. The method of forming a power transmission belt/belt sleeve according to claim 1 wherein the step of providing a supply of liquified matrix material comprises the step of providing a supply of liquified polyurethane.

13. The method of forming a power transmission belt/belt sleeve according to claim 1 wherein the non-woven fabric has oppositely facing surfaces and a core between the oppositely facing surfaces and including the step of treating the fibers only in the core with a binder.

14. The method of forming a power transmission belt/belt sleeve according to claim 1 including the step of separating the belt/belt sleeve from the internal and external molds and cutting the belt/belt sleeve to define a plurality of endless toothed belts.

15. The method of forming a power transmission belt/belt sleeve according to claim 1 including the step of injecting liquified matrix material into the external mold before the internal mold is placed into the external mold.

16. A method of forming a power transmission belt/belt sleeve comprising the steps of:

providing a mold defining a mold space;

placing a non-woven fabric with individual fibers thereon in the mold space;

injecting a liquified matrix material into the mold space and thereby causing fibers to separate from the non-woven fabric in the mold space;

curing the liquified matrix material; and separating the power transmission belt/belt sleeve from the mold.

* * * * *